(12) United States Patent
Kim et al.

(10) Patent No.: US 7,879,478 B2
(45) Date of Patent: Feb. 1, 2011

(54) BATTERY MODULE AND METHOD OF MANUFACTURING THE SAME

(75) Inventors: Tae-Yong Kim, Suwon-si (KR); Sang-Won Byun, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 760 days.

(21) Appl. No.: 11/812,527

(22) Filed: Jun. 19, 2007

(65) Prior Publication Data

US 2008/0090136 A1 Apr. 17, 2008

(30) Foreign Application Priority Data

Oct. 17, 2006 (KR) ...................... 10-2006-0100828

(51) Int. Cl.
*H01M 2/02* (2006.01)
*H01M 2/12* (2006.01)

(52) U.S. Cl. .................. 429/82; 429/157; 429/158; 29/623.1

(58) Field of Classification Search ............... 429/53, 429/82, 157, 158; 29/623.1
See application file for complete search history.

(56) References Cited

U.S. PATENT DOCUMENTS

| 3,923,549 | A * | 12/1975 | Mabuchi et al. ............... 429/82 |
| 6,599,660 | B2 * | 7/2003 | Oda et al. .................... 429/158 |
| 7,611,800 | B2 * | 11/2009 | Kim ............................ 429/158 |
| 2003/0143459 | A1 * | 7/2003 | Kunimoto et al. ........... 429/158 |

OTHER PUBLICATIONS

Korean Utility Model Publication No. 97-59477, entitled *Battery Pack*, published on Nov. 10, 1997 (with English abstract).

* cited by examiner

*Primary Examiner*—Stephen J. Kalafut
(74) *Attorney, Agent, or Firm*—Robert E. Bushnell, Esq.

(57) ABSTRACT

A battery module comprises: first and second rechargeable batteries, each of which includes a casing for storing an electrode assembly and a cap assembly provided on top of the casing; an interconnector provided between an upper portion of the first rechargeable battery and a lower portion of the second rechargeable battery so as to connect the first and second rechargeable batteries with each other; and an insulation cover which covers interconnected portions of the first and second rechargeable batteries, and which has at least one ventilation outlet.

11 Claims, 4 Drawing Sheets

BATTERY MODULE AND METHOD OF MANUFACTURING THE SAME

CLAIM OF PRIORITY

This application makes reference to, incorporates the same herein, and claims all benefits accruing under 35 U.S.C. §119 from an application for BATTERY MODULE AND METHOD OF MANUFACTURING THE SAME earlier filed in the Korean Intellectual Property Office on the 17 Oct. 2006 and there duly assigned Serial No. 10-2006-0100828.

BACKGROUND OF THE INVENTION

1. Technical Field

The present invention relates to a battery module and a method of manufacturing the same and, more particularly, to a battery module having a gas ventilation outlet and a method of manufacturing the same by which safety can be guaranteed.

2. Related Art

A battery module includes a few or several tens of rechargeable batteries connected to each other. The rechargeable battery can be repeatedly charged and discharged because its chemical and electrical energy conversion is reversible.

These days, more and more mobile wireless electronic products are being developed, and the requirement for rechargeable batteries to have a high energy density has increased as the size thereof has been minimized and the weight reduced.

Widely used batteries include a nickel-cadmium battery, a nickel-hydrogen battery, a lithium battery, and the like. Particularly, the lithium rechargeable battery has an operation voltage of 3.6 V, which is triple that of the nickel-cadmium battery or the nickel-hydrogen battery, and also has a high energy density per unit weight. Therefore, the lithium rechargeable battery is becoming rapidly popular as a power supply for mobile electronic devices. Such a lithium rechargeable battery can be classified into a lithium ion rechargeable battery, a lithium ion polymer battery, and a lithium polymer battery. The lithium polymer battery is nearly similar to the lithium ion rechargeable battery, except that electrolyte of the lithium ion rechargeable battery is replaced by polymer. This property contributes to flexibility of design in the shape as well as to higher safety.

A typical rechargeable battery includes an electrode assembly having a positive electrode, a negative electrode, and a separator interposed therebetween, a casing which provides a space for storing the electrode assembly, and a cap plate combined with the casing to seal the electrode assembly. Each of the positive and negative electrodes includes a coated portion where an activation material is coated and an uncoated portion where the activation material is not coated. The uncoated portion is provided to collect the current generated in the positive and negative electrodes, and a conductive tap is attached thereto. The conductive tap induces the current generated in the positive and negative electrodes to the positive and negative terminals, respectively. The rechargeable battery may be manufactured in a variety of shapes such as a cylindrical, rectangular, and pouch type, depending on the shapes of the electrode assembly and the casing.

The battery module having a plurality of rechargeable batteries connected to one another as described above is being widely used as a power supply for driving motors of portable miniaturized electronic devices, such as a mobile phone, a personal computer, and a camcorder, and also for hybrid electric vehicles.

The battery module also includes various safety devices in order to prevent excessive pressure or heat. For example, if the internal pressure of the battery module exceeds an allowable limit, the battery module externally ventilates its internal gas to prevent explosion. For this purpose, the battery module should be designed to safely ventilate the internal gas. If a space for circulating the internal gas does not exist in the battery module, and the internal gas cannot be safely ventilated, the internal pressure may continuously increase, and the battery module may finally explode.

SUMMARY OF THE INVENTION

The present invention provides a battery module and a method of manufacturing the same, by which internal gas can be efficiently ventilated from the battery module when the internal pressure of the battery module exceeds an allowable limit.

According to an aspect of the present invention, a battery module comprises: first and second rechargeable batteries, each of which includes a casing for storing an electrode assembly and a cap assembly provided on top of the casing; an interconnector provided between an upper portion of the first rechargeable battery and a lower portion of the second rechargeable battery to connect the first and second rechargeable batteries to each other; and an insulation cover which covers interconnected portions of the first and second rechargeable batteries, and which has at least one ventilation outlet.

The insulation cover may include: a first insulation cover which covers the first rechargeable battery; and a second insulation cover which covers the second rechargeable battery and is connected to the first insulation cover. The ventilation outlet may be provided in at least one of the first and second insulation covers. The ventilation outlet may be connected to a space between an upper portion of the first rechargeable battery and a lower portion of the second rechargeable battery, and fluid discharged from the first rechargeable battery may be expelled through the ventilation outlet.

The insulation cover may include: a first insulation cover which covers a side face of the first rechargeable battery, and which has an engagement recess on its surface; and a second insulation cover which covers a side face of the second rechargeable battery, and which has an engagement protrusion in its one end so that the engagement recess is engaged with the engagement protrusion.

The side face of the second insulation cover may have at least one ventilation outlet. The ventilation outlet may be connected to a space between the upper portion of the first rechargeable battery and the lower portion of the second rechargeable battery, and fluid discharged from the first rechargeable battery may be expelled through the ventilated outlet.

The interconnector may include a bottom portion fixed to the cap assembly of the first rechargeable battery and a side face portion which is connected to the bottom portion in a single body and fixed to the casing of the second rechargeable battery. The bottom portion and the side face portion may be fixed using laser welding or resistance welding.

The second insulation cover may have in its interior a receive portion which receives the side face portion.

The insulation cover may be formed of a material selected from a group consisting of polypropylene, polycarbonate, polybutylene terephthalate, tetrafluoroethylene-perfluoroalkoxy, polyurethane, and silicon, or a combination thereof.

According to another aspect of the present invention, a battery module comprises: a plurality of unit batteries; at least one interconnector which interconnects the unit batteries while the unit batteries are arranged in a longitudinal direction; and at least one insulation cover which covers interconnected portions of the unit batteries, and which has at least one ventilation outlet through which fluid between the unit batteries is expelled. The insulation cover may include a first insulation cover and a second insulation cover connected to the first insulation cover.

According to still another aspect of the present invention, a method of manufacturing a battery module comprises: providing first and second insulation covers, at least one of the first and second insulation covers having a ventilation outlet; installing the first insulation cover in an upper portion of a first rechargeable battery; fixing a bottom portion of an interconnector to an upper portion of the first rechargeable battery; installing the second insulation cover in the second rechargeable battery; fixing a side face portion of the interconnector to a casing of the second rechargeable battery; and engaging the second insulation cover with the first insulation cover.

The engagement of the first and second insulation covers may be performed by providing an engagement recess in the first insulation cover, providing an engagement protrusion in the second insulation cover, and engaging the engagement protrusion with the engagement recess. The bottom portion and the side face portion may be fixed using resistance welding or laser welding.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
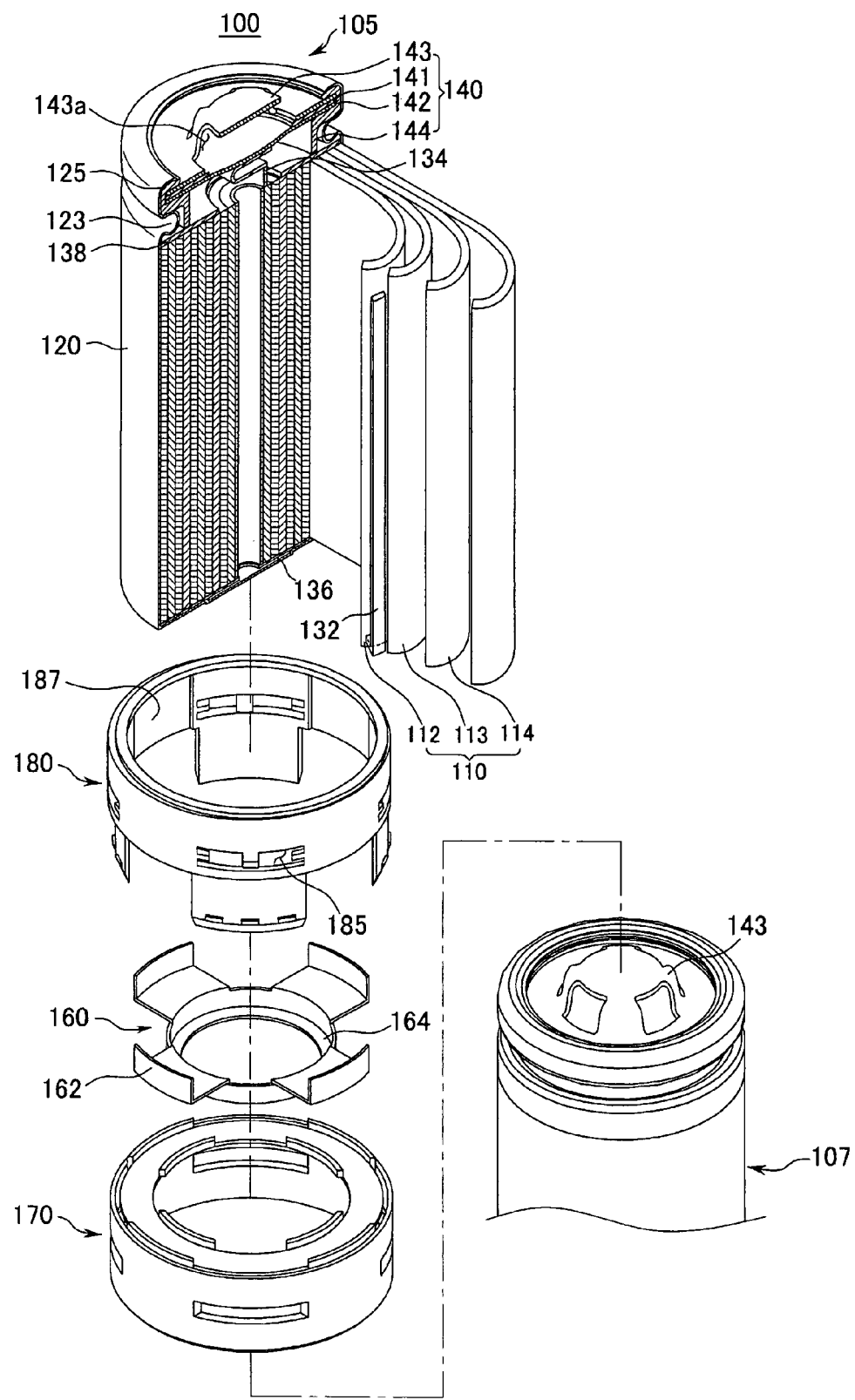
FIG. 1 is a partial cross-sectional exploded perspective view illustrating a battery module according to an embodiment of the present invention.

Hereinafter, exemplary embodiments of the present invention will be described in detail with reference to the attached drawings such that the present invention can be easily put into practice by those skilled in the art. However, the present invention is not limited to the embodiments described herein, but may be embodied in various forms. Elements that do not correspond to the present invention will not be described in order to provide a simplified description of the invention in association with the drawings. Like reference numerals denote like elements throughout the entire specification. Also, elements already well known in the art will not be described in detail.

FIG. 1 is a partial cross-sectional exploded perspective view illustrating a battery module according to the first embodiment of the present invention. The battery module 100 according to the first embodiment of the invention includes first and second rechargeable batteries 107 and 105, respectively, constructed of a lithium ion rechargeable battery. The construction shown in FIG. 1 is provided just to explain a principle of the invention, and thus, the invention is not limited to the lithium ion rechargeable battery. In addition, the battery module according to the invention may include two or more rechargeable batteries, and such a construction is also included in the scope of the invention.

Referring to FIG. 1, the battery module 100 includes: first and second rechargeable batteries 107 and 105, respectively, having an electrode assembly 110, a casing 120, a cap assembly 140, and a center pin (not shown in the drawing); an interconnector 160 for interconnecting the first and second rechargeable batteries 107 and 105, respectively, to each other; and first and second insulation covers 170 and 180, respectively, covering an upper side face of the first rechargeable battery 107 and a lower side face of the second rechargeable battery 105, respectively. Since the first and second rechargeable batteries 107 and 105, respectively, have the same structure, it is assumed that the first and second rechargeable batteries 107 and 105, respectively, have similar components as will be described later.

The electrode assembly 110 includes a negative electrode 112 having a charge collector where negative activation materials are attached, a positive electrode 114 having a charge collector where positive activation materials are attached, and a separator 113 interposed between the positive and negative electrodes 112 and 114, respectively, for preventing a short circuit therebetween.

More specifically, the negative electrode 112 is manufactured by coating a slurry type activation material layer, obtained by mixing a negative activation material powder, a negative binder, a bond and the like, on a charge collector such as a copper plate. The negative activation material may include a carbon material selected from the group consisting of natural graphite, artificial graphite, graphited carbon, non-graphited carbon, and a combination thereof as a main composition. In addition, a negative tap 132 is combined with the negative electrode 112, and makes contact with an internal bottom surface of the casing 120. As a result, the casing 120 can function as a negative electrode. Needless to say, it would be apparent to those skilled in the art that a negative charge collector (not shown in the drawing), instead of the negative tap 132, may be connected to the negative electrode 112.

The positive electrode 114 is manufactured by coating a slurry type activation material layer, obtained by mixing a positive activation material powder, a positive binder, a positive conductive additive and the like, on a charge collector such as an aluminum plate. The positive activation material may include a lithium metal oxide selected from the group consisting of $LiCoO_2$, $LiMnO_2$, $LiNiO_2$, $LiCrO_2$, and $LiMn_2O_4$. A positive tap 134 is combined with the positive electrode 114, extends out of the positive electrode 114, and is connected to a safety vent 142 of the cap assembly 140. Needless to say, a positive charge collector (not shown in the drawing), instead of the positive tap 134, may be connected to the positive electrode 114. In this case, a lead tap (not shown in the drawing) of the positive charge collector is connected to the cap assembly 140.

The separator 113 separates the positive and negative electrodes 112 and 114, respectively, to each other, and provides a circulation path for the lithium ions. The separator 113 may be a single layered film formed of polyethylene, polypropylene or polyvinylidene fluoride, a multi-layered film having two or more layers formed of polyethylene, polypropylene or polyvinylidene fluoride, or a mixed multi-layered film such as a polyethylene/polypropylene double layered separator, a polyethylene/polypropylene/polyethylene triple layered film, and a polypropylene/polyethylene/polypropylene triple layered separator.

This electrode assembly 110 may be obtained by sequentially stacking the negative electrode 112, the separator 113, and the positive electrode 114, combining a center rod (not shown in the drawing) with the end of the stack, and winding them in a cylindrical shape. The obtained electrode assembly 110 may be inserted into a casing 120, which will be described later, and then, the center pole rod may be separated from the electrode assembly 110. A vacant space, generated by separating the center rod, may be filled with a center pin (not shown in the drawing). The center pin is to prevent electrode assembly deformation, which can be generated during the charge/discharge operations of the first and second rechargeable batteries 107 and 105, respectively, and may have a cylindrical shape so as to fit into the vacant space. Such a center pin may be formed of a metal such as iron, copper, nickel, and a nickel alloy, or a polymer.

On the other hand, upper and lower insulation plates 138 and 136, respectively, are installed on upper and lower sides, respectively, of the aforementioned electrode assembly 110 in order to prevent an unnecessary electrical short between the electrode assembly 110 and the casing 120.

The casing 120 includes an internal space for storing the electrode assembly 110 in a cylindrical shape, and may be formed of a conductive metallic material, such as aluminum, an aluminum alloy or steel plated with nickel. The casing 120 has an open top surface, into which the electrode assembly 110 can be inserted. The casing 120 also includes a bead portion 123 and a crimped portion 125 in order to fix the cap assembly 140 for sealing the casing 120 and the electrode assembly 110 positioned in its internal space. The internal space of the sealed casing 120 is filled with an electrolyte (not shown in the drawing), which allows the lithium ions generated by an electrochemical response to move between the positive and negative electrodes 112 and 114, respectively, during the charge/discharge operations.

The cap assembly 140 includes an electrode cap 143, a positive temperature coefficient element 141, a safety vent 142, and a gasket 144, and is installed on top of the open casing 120 so as to seal it.

The gasket 144 covers side surfaces of the conductive electrode cap 143, the positive temperature coefficient element 141, and the safety vent 142 so as to insulate them from the casing 120.

The safety vent 142 has a lower surface where a positive electrode tap 134, extending from the positive electrode 114, is attached using a bonding process, such as welding. The safety vent 142 is upwardly switched to cut off electrical connection with the positive electrode 114 when the internal pressure of the rechargeable battery 105 or 107 exceeds a predetermined value. Although the safety vent 142 and the positive electrode tap 134 are directly connected to each other in the present embodiment, it will be apparent to those skilled in the art that an insulation member (not shown in the drawing) and a cap plate (not shown in the drawing) may be further sequentially stacked under the safety vent 142, and that the positive electrode tap 134 may be combined with the cap plate.

The positive temperature coefficient element 141 is connected to an upper portion of the safety vent 142. The electrical resistance of the positive temperature coefficient element 141 increases to a nearly infinite level when its temperature exceeds a predetermined level. Therefore, it can be used to stop a charge/discharge current flow when the temperature of the rechargeable battery 105 or 107 increases over a predetermined level. When the temperature of the rechargeable battery 105 or 107 is lowered so as to be below a predetermined level, the electrical resistance of the positive temperature coefficient element 141 is reduced again. Accordingly, the functions of the rechargeable batteries 105 and 107 can be recovered.

The battery module 100 according to the present embodiment may further include a separate safety means, in addition to the aforementioned safety vent 142 and the positive temperature coefficient element 141, in order to prevent abnormal conditions caused by an excessive charge/discharge operation, an excessively high temperature, an overflow current, and the like.

The electrode cap 143 is connected to an upper portion of the positive temperature coefficient element 141 so as to externally apply the current. The side face of the electrode cap 143 has a degassing hole 143a which allows an internal gas of the rechargeable battery 100 to be ventilated when the safety vent 143 is broken down. On the other hand, a connection cap (not shown in the drawing) may be combined with an upper portion of the electrode cap 143 of the second rechargeable battery 105. In addition, a connection member (not shown in the drawing) may be joined to the connection cap so as to connect the second rechargeable battery 105 to another rechargeable battery (not shown in the drawing) disposed adjacent in a horizontal direction.

The interconnector 160 includes a bottom portion 164 and four side face portions 162 which are connected to the bottom portion 164 in a single body and spaced from one another at a predetermined interval. The interconnector 160 electrically interconnects the first and second rechargeable batteries 107 and 105, respectively, having the aforementioned components.

The first and second insulation covers 170 and 180, respectively, are installed so as to cover the side faces of the first and second rechargeable batteries 107 and 105, respectively. The insulation covers 170 and 180 provide insulation between the electrodes and absorb vibration.

The second insulation cover 180 has a ventilation outlet 185 in order to allow the internal gas accumulated in the first rechargeable battery 107 to be efficiently ventilated. In addition, the interior of the second insulation cover 180 has a receive portion 187 for receiving the side face portions 162 of the interconnector 160.

Hereinafter, the aforementioned interconnector 160 and the insulation covers 170 and 180 will be described in more detail with reference to FIGS. 2 and 3.

Figure 2:
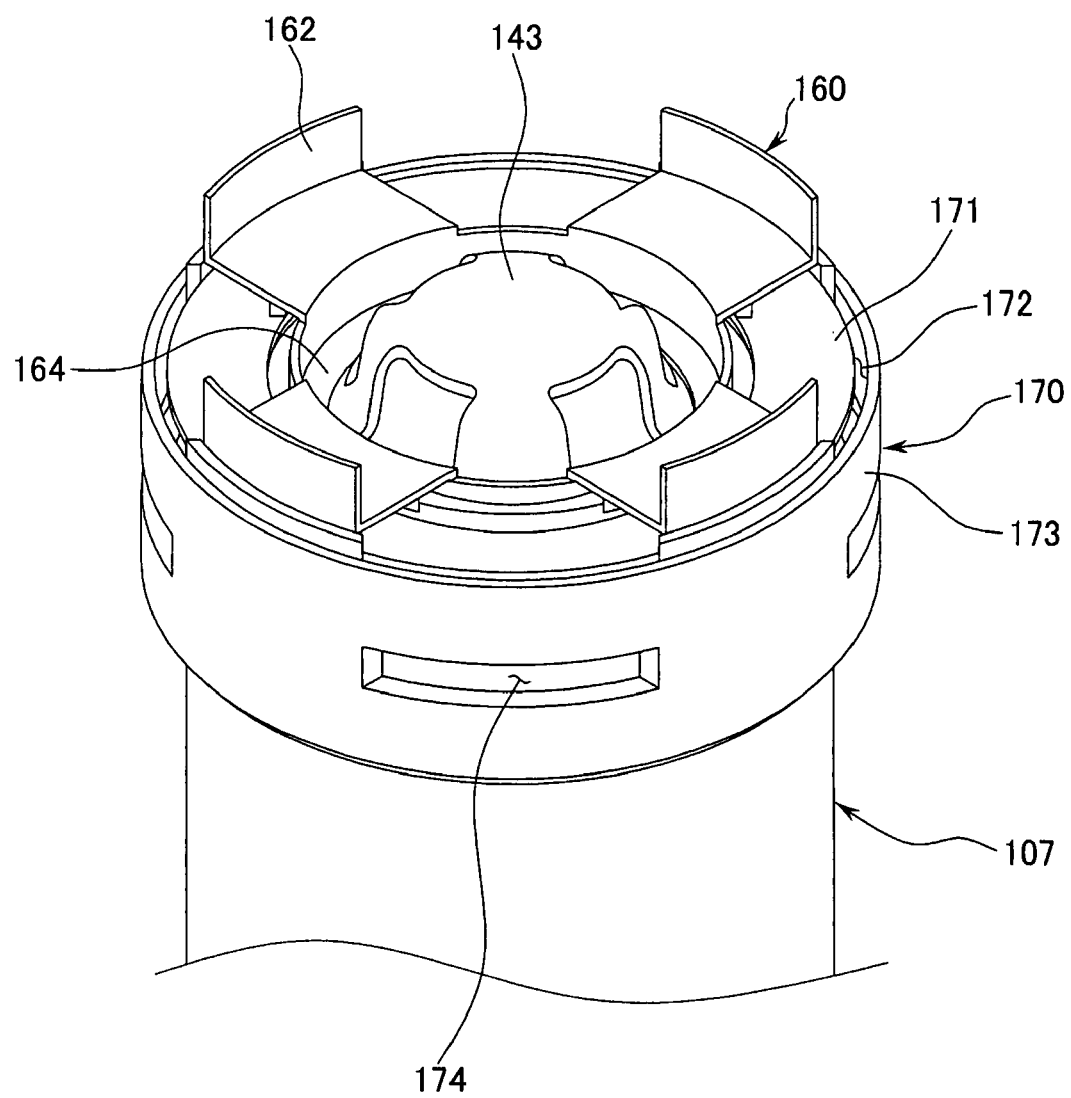
FIG. 2 is a perspective view illustrating a state wherein an interconnector and a first insulation cover are combined with a first rechargeable battery shown in FIG. 1.

FIG. 2 is a perspective view illustrating a state wherein an interconnector and a first insulation cover are combined with a first rechargeable battery shown in FIG. 1.

More specifically, FIG. 2 is a perspective view illustrating a state wherein the interconnector 160 and the first insulation cover 170 are combined with the first rechargeable battery 107. Further referring to FIG. 2, the first insulation cover 170 includes a top face member 171 which covers a portion of the top face of the first rechargeable battery 107, and a side face member 173 which is connected to the top face member 171 and surrounds an upper side face of the first rechargeable battery 107. In addition, four engagement recesses 172 spaced at a predetermined interval are provided between the top face member 171 and the side face member 173 so that engagement portions 182 of the second insulation cover 180 can be inserted into the engagement recesses 172. Furthermore the side face member 173 has four engagement recesses 174. According to the present embodiment, the engagement recesses 174 are formed by puncturing the side face member 173 so that engagement protrusions 184 of the second insulation cover 180 can be engaged with the engagement recesses 174, as will be described later.

The interconnector 160 includes a bottom portion 164 and four side face portions 162 which are connected with the bottom portion 164 in a single body, and which are spaced from one another by a predetermined interval. The interconnector 160 electrically interconnects the first and second rechargeable batteries 107 and 105, respectively, having the aforementioned components. Each side face portion 162 is fixed to a lower side face of the casing 120 of the second rechargeable battery 105 (refer to FIG. 1), and the bottom portion 164 connected to the side face portion 162 in a single body is fixed to the electrode cap 143 of the first rechargeable battery 107. The interconnector 160 may be fixed using a variety of fabricating methods, such as welding, which is preferably used according to the present embodiment. Resistance welding or laser welding may be used as the welding method.

Figure 3:
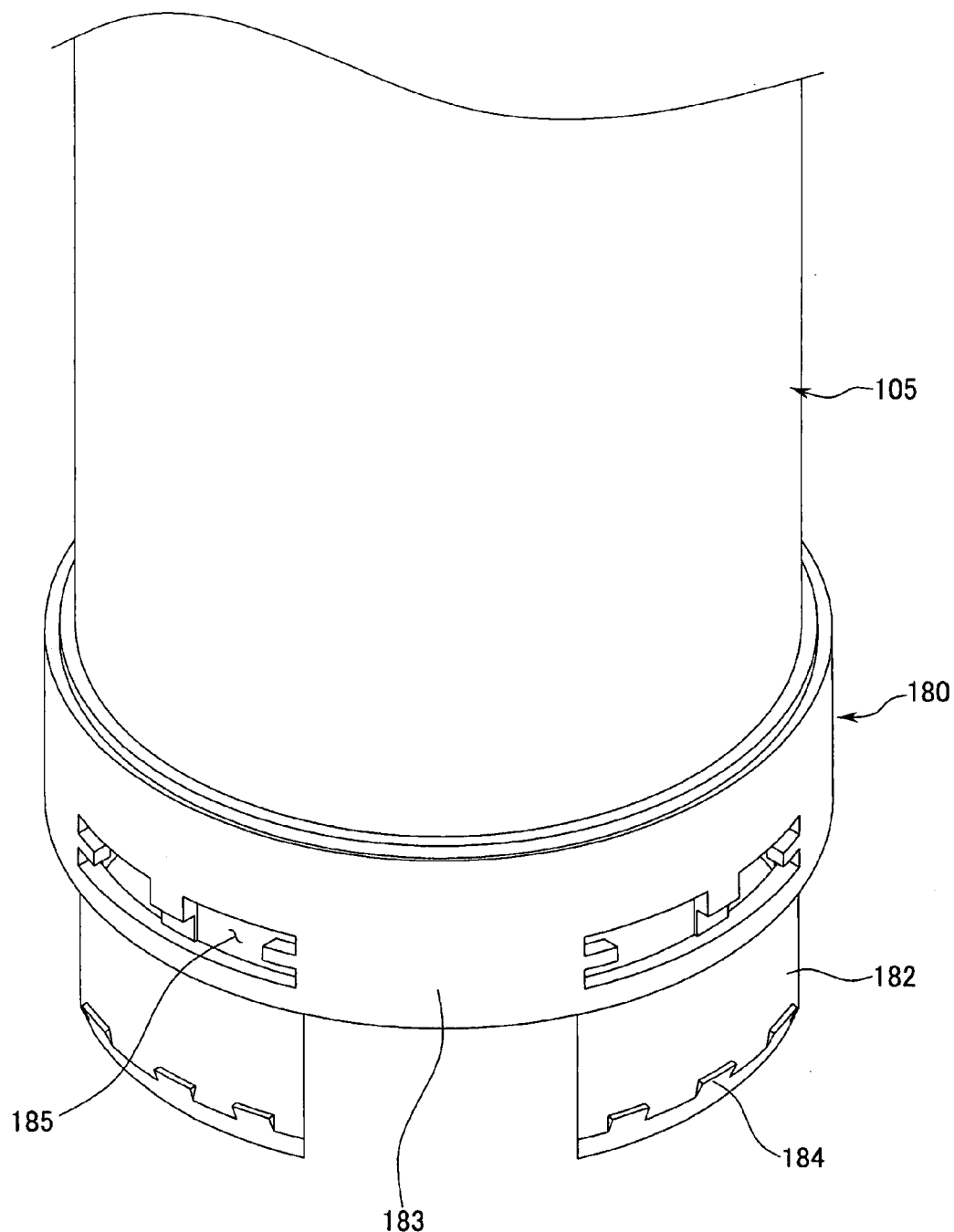
FIG. 3 is a perspective view illustrating a state wherein the second insulation cover and the rechargeable battery shown in FIG. 1 are combined with each other.

FIG. 3 is a perspective view illustrating a state wherein a second insulation cover is combined with a second rechargeable battery. Referring to FIG. 3, the second insulation cover 180 includes four engagement portions 182 connected to a side face member 183 which covers the lower side face of the second rechargeable battery 105. Each engagement portion 182 includes a lower end which is opposite to a portion where the side face member 183 is connected, and which has three engagement protrusions 184 in its outer edge. Each of the three engagement protrusions 184 is engaged with a respective engagement recess 174 (FIG. 2) of the first rechargeable battery 107 as mentioned above.

The side face member 183 of the second insulation cover 180 includes ventilation outlets 185 connected between an upper portion of the first rechargeable battery 107 and a lower portion of the second rechargeable battery 105. The ventilation outlets 185 are provided to efficiently ventilate the internal gas of the first rechargeable battery 107. According to the present embodiment, two ventilation outlets 185 are formed in an upper side of each engagement portion 182. In addition, an internal side of the second insulation cover 180 includes receive portions 187 (refer to FIG. 1) for receiving the side face portion 162 of the interconnector 160 which is fixed to the lower side face of the casing 120 of the second rechargeable battery 105.

Meanwhile, the aforementioned first and second insulation covers 170 and 180, respectively, may be formed of a material selected from the group consisting of polypropylene (PP), polycarbonate (PC), polybutylene terephthalate (PBT), tetrafluoroethylene-perfluoroalkoxy (PFA), polyurethane (PU), and silicon (Si), or a combination thereof.

Figure 4:
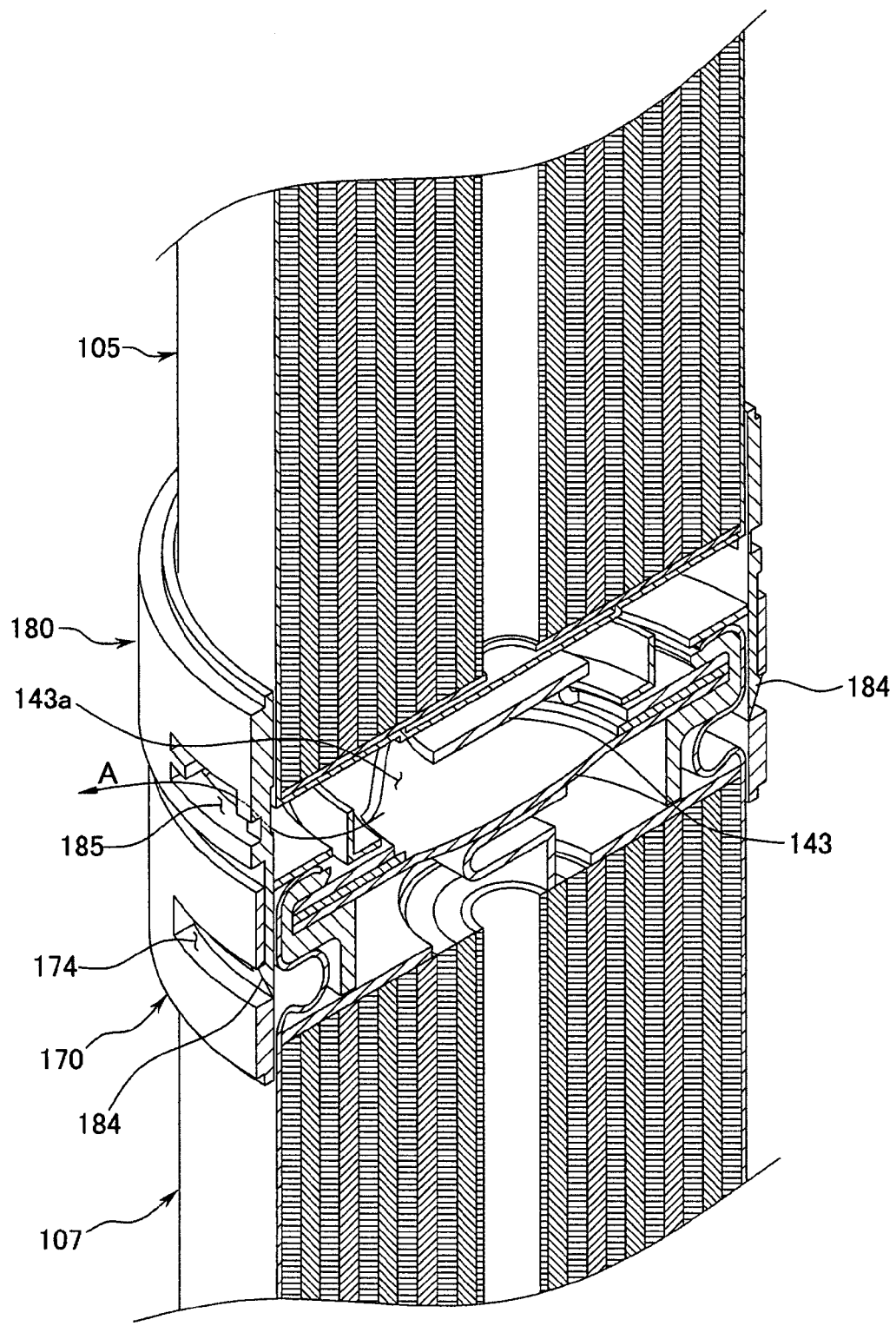
FIG. 4 is a cross-sectional view illustrating a state wherein the battery module shown in FIG. 1 is installed.

FIG. 4 is a cross-sectional view illustrating a state wherein the battery module shown in FIG. 1 is installed. Referring to FIG. 1, it is recognized that the engagement portions 182 (refer to FIG. 3) of the second insulation cover 180 are inserted into the engagement recesses 174 of the first insulation cover 170, and then, the engagement protrusions 184 formed on the engagement portions 182 are combined with the engagement recesses 174 of the first insulation cover 170. In addition, the side face member 183 (refer to FIG. 3) of the second insulation cover 180 has at least one ventilation outlet 185 connected between an upper portion of the first rechargeable battery 107 and a lower portion of the second rechargeable battery 105.

Hereinafter, gas flow through the ventilation outlet 185 will be described. When the internal pressure of the first rechargeable battery 107 exceeds an allowable limit for some reason, a notch (not shown in the drawing) of the safety vent will break down. Then, the gas remaining in the first rechargeable battery 107 will flow into a space between the upper portion of the first rechargeable battery 107 and a lower portion of the second rechargeable battery 105 through the broken notch and the degassing hole 143a of the electrode cap 143. Finally, the gas will be externally ventilated from the battery module 100 through the ventilation outlet 185 provided in the second insulation cover 180 (in the direction of arrow A in FIG. 4).

If the ventilation outlet 185 according to the present embodiment is not provided in the second insulation cover 180, the internal gas of the first rechargeable battery 107 will be difficult to be externally ventilated, and the battery module 100 may explode due to an excessive internal pressure. According to the present embodiment, since the internal gas of the first rechargeable battery 107 is efficiently ventilated from the battery module 100 through the ventilation outlet 185, it is possible to eliminate the risk of explosion.

According to the present invention, the internal gas generated in the rechargeable battery is efficiently ventilated from the battery module through the ventilation outlet provided in the insulation cover. Therefore, it is possible to prevent the battery module from exploding due to excessive internal pressure.

Although exemplary embodiments of the present invention have been described, the present invention is not limited to the embodiments, but may be modified in various forms without departing from the scope of the invention as defined in the appended claims, the detailed description, and the accompanying drawings. Therefore, it is natural that such modifications fall within the scope of the present invention.

What is claimed is:

1. A battery module, comprising:
first and second rechargeable batteries, each including a casing for storing an electrode assembly and a cap assembly provided on top of the casing;
an interconnector provided between an upper portion of the first rechargeable battery and a lower portion of the second rechargeable battery for connecting the first and second rechargeable batteries to each other; and
an insulation cover which covers interconnected portions of the first and second rechargeable batteries, and which has at least one ventilation outlet;
wherein the insulation cover includes:
a first insulation cover which covers a side face of the first rechargeable battery; and
a second insulation cover which covers a side face of the second rechargeable battery, and which is connected to the first insulation cover; and
wherein the first insulation cover has an engagement recess formed on a surface of the first insulation cover and the second insulation cover has an engagement protrusion formed in one end of the second insulation cover so that the engagement recess is engaged with the engagement protrusion.

2. The battery module of claim 1, wherein said at least one ventilation outlet is provided in at least one of the first and second insulation covers.

3. The battery module of claim 2, wherein said at least one ventilation outlet is connected to a space between an upper portion of the first rechargeable battery and a lower portion of the second rechargeable battery, and wherein fluid discharged from the first rechargeable battery is expelled through said at least one ventilation outlet.

4. The battery module of claim 1, wherein the insulation cover is formed of a material selected from a group consisting of polypropylene, polycarbonate, polybutylene terephthalate, tetrafluoroethylene-perfluoroalkoxy, polyurethane, silicon, and a combination thereof.

5. A battery module of claim 1, comprising:

first and second rechargeable batteries, each including a casing for storing an electrode assembly and a cap assembly provided on top of the casing;

an interconnector provided between an upper portion of the first rechargeable battery and a lower portion of the second rechargeable battery for connecting the first and second rechargeable batteries to each other; and an insulation cover which covers interconnected portions of the first and second rechargeable batteries, and which has at least one ventilation outlet;

wherein the insulation cover includes:

a first insulation cover which covers a side face of the first rechargeable battery; and a second insulation cover which covers a side face of the second rechargeable battery, and which is connected to the first insulation cover; and wherein a side face of the second insulation cover has at least one ventilation outlet.

6. The battery module of claim 5, wherein said at least one ventilation outlet is connected to a space between an upper portion of the first rechargeable battery and a lower portion of the second rechargeable battery, and wherein fluid discharged from the first rechargeable battery is expelled through said at least one ventilation outlet.

7. The battery module of claim 6, wherein the interconnector includes a bottom portion fixed to the cap assembly of the first rechargeable battery and a side face portion which is connected to the bottom portion in a single body, and which is fixed to the casing of the second rechargeable battery.

8. The battery module of claim 7, wherein the bottom portion and the side face portion are fixed using one of laser welding and resistance welding.

9. The battery module of claim 7, wherein the second insulation cover has a receive portion in an interior thereof for receiving the side face portion.

10. A method of manufacturing a battery module, comprising the steps of:

providing first and second insulation covers;

providing at least one of the first and second insulation covers with a ventilation outlet;

installing the first insulation cover in an upper portion of a first rechargeable battery in the manner of covering a side face of the first rechargeable battery;

providing an interconnector;

fixing a bottom portion of the interconnector to an upper portion of the first rechargeable battery;

installing the second insulation cover in the second rechargeable battery in the manner of covering a side face of the second rechargeable battery;

fixing a side face portion of the interconnector to a casing of the second rechargeable battery; and engaging the second insulation cover with the first insulation cover;

wherein the step of engaging the second insulation cover with the first insulation cover comprises providing an engagement recess in the first insulation cover, providing an engagement protrusion in the second insulation cover, and engaging the engagement protrusion with the engagement recess.

11. The method of claim 10, wherein the bottom portion and the side face portion of the interconnector are fixed using one of resistance welding and laser welding.

* * * * *